United States Patent [19]
Krubiner et al.

[11] 3,716,530
[45] Feb. 13, 1973

[54] HALOGENATION OF STEROIDS

[75] Inventors: Alan Martin Krubiner, Montville; Eugene Paul Oliveto, Glen Ridge, both of N.J.

[73] Assignee: Hoffmann-La Roche Inc., Nutley, N.J.

[22] Filed: Aug. 10, 1971

[21] Appl. No.: 170,639

[52] U.S. Cl........260/239.55 C, 260/397, 260/397.3, 260/397.5

[51] Int. Cl......................C07c 173/00, C07c 169/08
[58] Field of Search ....... Machine Searched Steroids

*Primary Examiner*—Henry A. French
*Attorney*—Samuel L. Welt et al.

[57] ABSTRACT

A process for converting 17α-vinyl-17β-hydroxy steroids to 17-(2-haloethylidene)-steroids, known intermediates for antifungal and progestational agents, by treating the 17α-vinyl-17β-hydroxy steroids with vanadium tetrahalide.

13 Claims, No Drawings

HALOGENATION OF STEROIDS

BACKGROUND OF THE INVENTION

As disclosed in Colton et al., U.S. Pat. No. 3,536,703, October 17, 1970, 17α-vinyl-17β-hydroxy steroids have been converted to 17-(2-haloethylidene)-steroids by treatment with phosphorous trihalide. However, this procedure has proven extremely disadvantageous since the 17-haloethylidene steroids have only been obtained in very low yields, i.e., at most about 40 percent. Furthermore, the nature of the phosphorous trihalide causes, in some cases, many side reactions producing difficulty separable materials which contaminate the final product. This has especially been the case where the steroid nucleus contains various functional groups. Therefore, the use of phosphorous trihalides to produce 17-haloethylidene steroids which are intermediates for compounds destined for pharmaceutical uses has not proven entirely commercially acceptable. Hence, it has long been desired to provide an efficient process for converting a 17α-vinyl-17β-hydroxy steroid to 17-(2-haloethylidene) steroids.

SUMMARY OF THE INVENTION

In accordance with this invention, it has been discovered that when a steroid of the formula:

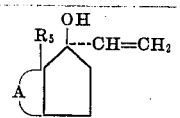

wherein A represents the remainder of a steroid or 19-nor steroid nucleus;
is treated with vanadium tetrahalide, a 17-haloethylidene compound of the formula:

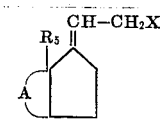

wherein A is as above; and X is a halogen; and $R_5$ is hydrogen or lower alkyl;
is obtained. The use of the process of this invention, it has been found, produces the haloethylidene steroid of formula II in yields as high as 80 percent. Furthermore, by use of the process of this invention, the difficulties encountered through use of a phosphorous trihalide is avoided. Additionally, it has been found that vanadium tetrahalide specifically halogenates the 17α-vinyl substituent on the steroid of formula I to produce a compound of formula II without substantially affecting functional groups which may be present at other positions on the steroid nucleus. Therefore, the process of this invention provides a method which can generally be applied for converting all types of 17α-vinyl-17β-hydroxy steroids or 19 nor steroids to 17-(2-haloethylidene)-steroids or 19 nor steroids.

DETAILED DESCRIPTION OF THE INVENTION

As used herein, the term "halogen" includes all four halogens, i.e., chlorine, fluorine, bromine and iodine with chlorine being preferred. The term "lower alkyl" comprehends both straight and branched chain saturated hydrocarbon groups containing from one to six carbon atoms such as methyl, ethyl, n-propyl and i-propyl. The term "lower alkanoyloxy" designates lower alkanoyloxy groups when the lower alkanoyl portion containing from one to six carbon atoms. Among these lower alkanoyl groups are included formyl, acetyl, etc. The term "lower alkylenedioxy" designates lower alkylenedioxy radicals containing from one to six carbon atoms such as ethylenedioxy, isopropylidenedioxy, etc. The term "lower alkoxy" designates lower alkoxy groups containing from one to six carbon atoms such as methoxy, ethoxy, propoxy, etc.

In accordance with this invention, any 17α-vinyl 17β-hydroxy steroid or 19-nor steroid of the formula I can be converted to the 17-haloethylidene steroid of the formula II by treatment with vanadium tetrahalide.

Among the preferred compounds of formula I which can be subjected to the process of this invention are included compounds of the formula:

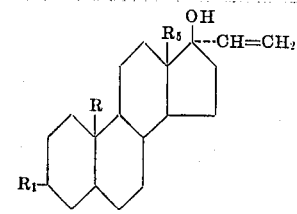

wherein R and $R_5$ are hydrogen or lower alkyl;
$R_1$ is hydrogen, hydroxy, lower alkoxy oxo or a group convertible thereto by hydrolysis or $\Delta^1$, $\Delta^4$, $\Delta^5$ and $\Delta^{1,4}$ derivatives thereof
and compounds of the formula:

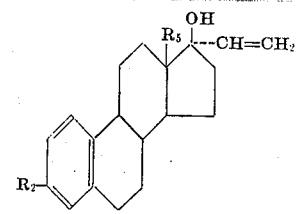

wherein $R_2$ is hydrogen, lower alkoxy, hydroxy or a group convertible thereto by hydrolysis, and $R_5$ is as above.

Upon treating the compound of formula I-A with vanadium tetrachloride a compound of the formula:

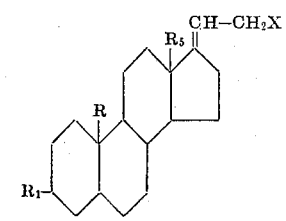

wherein X, R, $R_1$ and $R_5$ are as above;
or $\Delta^1$, $\Delta^4$, $\Delta^5$, $\Delta^{1,4}$ derivatives thereof are formed.

Upon treating the compound of formula I-B with vanadium tetrahalide, a compound of the formula:

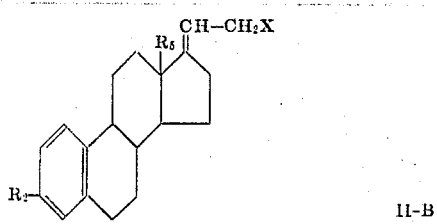

wherein $R_2$, $R_5$ and X are as above; is formed.

The compound of formula II can be converted to known useful steroids or 19-nor steroids of the formula:

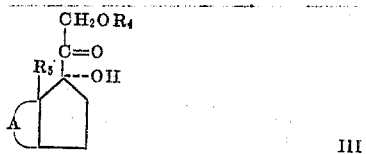

wherein $R_4$ is lower alkanoyl such as acetyl and $R_5$ and A are as above;

via an intermediate of the formula:

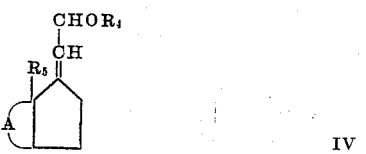

wherein A, $R_4$ and $R_5$ are as above;

On the other hand, the compounds of formula II can be converted into known useful steroids or 19-nor steroids of the formula

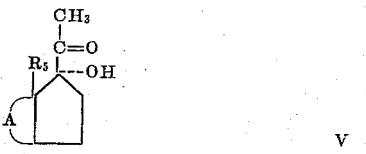

wherein A and $R_5$ are as above;

via an intermediate of the formula:

wherein A and $R_5$ are as above.

In the compounds of formula I-A and formula I-B where $R_1$ or $R_2$ is a hydroxy group, the 3-hydroxy group, can, if desired, be protected by esterification and/or etherification of the hydroxy group. Any available acid which will form an ester that can be subsequently hydrolyzed to regenerate the hydroxy group is suitable. Exemplary acids useful for this purpose are lower alkanoic acids, e.g., acetic acid, caproic acid, benzoic acid, phosphoric acid, and lower alkane dicarboxylic acids, e.g., succinic acid. On the other hand, the 3-hydroxy group can be protected with an ether protecting group which can be subsequently hydrolyzed to regenerate the hydroxy group. Among the suitable ether protecting groups are the tetrahydropyranyl ether, arylmethyl ethers such as benzyl, benzhydryl and trityl ethers or α-lower alkoxy-lower alkyl ethers, for example, methoxymethyl, or allylic ethers.

Where $R_1$ is an oxo group, this oxo group can, if desired, be protected by ketalization. Any alcohol which will form a ketal that can be subsequently hydrolyzed to regenerate the oxo group is suitable. Exemplary ketals useful for this purpose are lower alkane diols such as 1,2-ethylene diol.

The compound of formula I is converted to the compound of formula II in accordance with this invention by treating the compound of formula I with a vanadium tetrahalide. The preferred vanadium tetrahalide is vanadium tetrachloride. Generally this reaction is carried out in the presence of an inert organic solvent. Any conventional inert organic solvent can be utilized in carrying out this reaction. Among the preferred inert organic solvents are included benzene, ethyl acetate, toluene, etc. In carrying out this reaction, temperature and pressure are not critical, and this reaction can be carried out at room temperature and atmospheric pressure. However, higher or lower temperatures can, if desired, be utilized. Generally, this reaction can be carried out at a temperature of from −25°C. to the reflux temperature of the reaction mixture. In carrying out the process in accordance with this invention, generally one equivalent of the compound of formula I is reacted with approximately 1 equivalent of vanadium tetrahalide. However, if desired, stoicheometric excesses of either the compound of formula I or vanadium tetrahalide can be utilized in carrying out this reaction.

Generally, it is preferred to carry out this reaction in the presence of an alkali metal salt. It has been found that, in some cases, higher yields of the compound of formula II is obtained when the reaction is carried out in the presence of an alkali metal salt. If desired, in carrying out this reaction, any conventional alkali metal salt can be added to the reaction mixture. Among the conventional alkali metal salts which can be utilized are included alkali metal carbonates and bicarbonates such as sodium carbonate and sodium bicarbonate; and alkali metal salts of the inorganic aliphatic acids such as sodium propionate, sodium acetate, etc. Among the preferred alkali metal salts of lower alkanoic acids is included sodium acetate. If the alkali metal salt is utilized in carrying out this reaction, generally it has been found that improved results are obtained by utilizing from about 1 to 10 moles of the alkali metal salt per mole of the vanadium tetrahalide utilized.

The compound of formula II can be converted to the compound of formula IV by treating the compound of the formula II with a salt of a lower alkanoic acid. In carrying out this reaction, any salt of a lower alkanoic acid can be utilized. Among the salts of the lower alkanoic acids are included the alkali metal salts such as sodium acetate, sodium propionate, potassium acetate, etc., and organic amine salts such as triethyl ammonium acetate, guanidinium acetate, and pyridinium acetate. This reaction is generally carried out in the presence of an inert organic solvent such as the polar solvents. Among the polar solvents which can be utilized in accordance with this invention are included acetone, dimethyl sulfoxide, methanol, ethanol and dimethyl formamide. Generally, this reaction is carried out by heating the reaction mixture to a temperature of 40°C. to the reflux temperature of the reaction medium.

The compound of formula IV is converted to the compound of formula III by treating the compound of formula IV with a peroxide oxidizing agent utilizing osmium tetroxide as a catalyst. In carrying out this reaction, any conventional peroxide oxidizing agent can be utilized. Among the peroxide oxidizing agents which can be utilized are amine oxide peroxides such as N-methylmorpholine oxide peroxide. Generally, this reaction is carried out in an inert organic solvent. Any conventional inert organic solvent can be utilized in carrying out this reaction. Among the conventional inert organic solvents which can be utilized are included alcohols such as tertiary butanol, ethanol, methanol, etc., and halogenated hydrocarbons such as methylene chloride, etc. Generally, this reaction can be carried out in the presence of a base. Among the preferred bases which can be utilized in carrying out this reaction are the organic amine bases such as pyridine, diethyl amine, dimethyl amine, etc. In carrying out this reaction, temperature and pressure are not critical and this reaction can be carried out at room temperature and atmospheric pressure. If desired, higher or lower temperatures can be utilized. Generally, this reaction is carried out at a temperature of from 0°C. to 40°C.

On the other hand, the compound of formula II can be converted to the compound of formula VI by treating the compound of formula II with a reducing agent. Among the preferred reducing agents for converting the compound of the formula II to the compound of the formula VI are included the mixed metal alkali metal hydrides such as lithium aluminum hydride. This reaction can be carried out in an inert organic solvent. Any conventional inert organic solvent can be utilized for carrying out this reaction. Among the preferred inert organic solvents for use in this reaction are included ethers such as diethyl ether, tetrahydrofuran, etc. In carrying out this reaction, temperature and pressure are not critical and this reaction can be carried out at room temperature and atmospheric pressure. However, if desired, higher of lower temperatures can be utilized. Generally, it is preferred to carry out this reaction at a temperature of from 0°C. to the reflux temperature of the reaction medium. Prior to carrying out this reaction, it is generally desirable to protect the oxo or hydroxy groups on the steroid nucleus, e.g., conversion to ketals, ethers or esters as set forth hereinabove.

The compound of formula VI can be converted into the compound of formula V by treating the compound of formula VI with a peroxide oxidizing agent utilizing osmium tetroxide as a catalyst. The same conditions described in connection with the conversion of a compound of the formula IV to a compound of the formula III can be utilized in converting the compound of the formula VI to the compound of the formula V.

The following examples are illustrative but not limitative of this invention. In the examples, all temperatures are given in degrees Centigrade.

EXAMPLE 1

One gram of 17β-hydroxy-17α-vinyl androst-4-en-3-one was dissolved in about 10 ml. of ethyl acetate containing 1.2 g. of sodium acetate. To this solution there was added dropwise 0.6 g. of vanadium tetrachloride in about 10 ml. of ethyl acetate. The reaction mixture was allowed to stand at room temperature for about one-half hour. After this period, the mixture was poured into a saturated aqueous sodium bicarbonate solution. The resulting organic layer was separated from the aqueous layer. The organic layer was washed, dried and evaporated to yield 21-chloro-3-oxo-pregna-4,17(20)-diene.

EXAMPLE 2

By the procedure of Example 1:

17β-hydroxy-17α-vinyl-19-norandrost-4-en-3-one was converted to 21-chloro-3-oxo-19-norpregna-4,17(20)-diene;

17β-hydroxy-17α-vinyl-androstan-3-one was converted to 21-chloro-3-oxo-pregn-17(20)-ene;
17β-hydroxy-17α-vinyl-19-norandrostan-3-one was converted to 21-chloro-3-oxo-19-norpregn-17(20)-ene;
17α-vinyl-androst-5-ene-3β,17-diol was converted to 21-chloro-3β-hydroxy-pregna-5,17(20)-diene;
17α-vinyl-19-norandrost-5-ene-3β,1717β-diol was converted to 21-chloro-3β-hydroxy-19-norpregna-5,17(20)-diene;
17α-vinyl-1,4-androstadien-17β-ol-3-one was converted to 21-chloro-3-oxo-pregna-1,4,17(20)-triene;
3-acetoxy-17α-vinyl-androstan-17β-ol was converted to 3-acetoxy-21-chloro-pregn-17(20)-ene;
3-acetoxy-17α-vinyl-19-norandrostan-17β-ol was converted to 3-acetoxy-21-chloro-19-norpregn-17(20)-ene;
3-oxo-17α-vinyl-androst-5-en-17β-ol was converted to 21-chloro-3-oxo-pregna-5,17(20)-diene; and
3,3-ethylenedioxy-17α-vinyl-androst-5-en-17β-ol was converted to 21-chloro-3,3-ethylenedioxy-pregna-5,17(20)-diene.

EXAMPLE 3

Trans-3-methoxy-21-chloro-19-norpregna-1,3,5(10), 17(20)-tetraene

A solution of 7.0 g. of 17α-vinylestradiol-3-methyl ether in 50 ml. of dry ethyl acetate was stirred at room temperature while a slow stream of dry air was introduced. A solution of 2.45 ml. (4.4 g.) of vanadium tetrachloride in 50 ml. of dry ethyl acetate was added dropwise over 5 minutes. As the vanadium tetrachloride was introduced the reaction mixture turned light blue.

After 1 hour the reaction mixture was washed twice with an aqueous solution containing 5 percent by weight of sodium bicarbonate, twice with water, dried and evaporated. The crude product was recrystallized from diethyl ether-petroleum ether (b.p. 30°–60°) to afford 5.15 g. (70%) of trans-3-methoxy-21-chloro-19-norpregna-1,3,5(10),17(20)-tetraene.

EXAMPLE 4

Trans-3-methoxy-21-acetoxy-19-norpregna-1,3,5(10), 17(20)-tetraene

A mixture of 2.0 g. of trans-3-methoxy-21-chloro-19-nor-pregna-1,3,5(10),17(20)-tetraene and 3.57 g. of guanidinium acetate in 50 ml. of dimethylformamide was heated at 60°–70° for 18 hours in a nitrogen atmosphere. The reaction was cooled, diluted with water and extracted 3 times with diethyl ether. The either was washed twice with 1N aqueous hydrochloric acid, twice with an aqueous solution containing 5 percent sodium bicarbonate solution and 3 times with saturated brine. After drying, the ether was removed to afford 1.9 g. of yellow oil. This was chromatographed on 100 g. of silica gel. Benzene eluted 1.35 g. of clear oil, which solidified. This was recrystallized from petroleum ether methanol to afford trans-3-methoxy-21-acetoxy-19-norpregna-1,3,5(10),17(20)-tetraene as white crystals; m.p. 65°–66°.

EXAMPLE 5

A suspension of 150 mg. of lithium aluminum hydride in 25 ml. of dry tetrahydrofuran was treated dropwise with a solution of 0.5 g. of trans-3-methoxy-21-chloro-19-norpregna-1,3,5(10,17(20)-tetraene in 10 ml. of dry tetrahydrofuran. The mixture was heated to reflux for 18 hours, cooled and the excess hydride killed by cautious addition of saturated aqueous sodium sulfate solution. The organic layer was decanted and the precipitated solids were washed with diethyl ether. The combined organic extracts were evaporated and the residue was recrystallized from diethyl ether-methanol to afford trans-3-methoxy-19-norpregna-1,3,5(10),17(20)-tetraene.

EXAMPLE 6

3-Methoxy-19-norpregna-1,3,5(10)-tetraen-17α-ol-20-one

A solution of 0.5 g. of trans-3-methoxy-19-norpregna-1,3,5(10),17(20)-tetraene, 0.7 ml. of pyridine and 2.5 ml. of methylene chloride in 21 ml. of tertiary butanol was treated with 5.8 ml. of N-methylmorpholine oxide peroxide in tertiary butanol (1 ml. titrated against 16 ml. 0.1N thiosulfate) and 0.27 ml. of a 3 percent by weight solution of osmium tetroxide in tertiary butanol. After stirring overnight at room temperature, 4 ml. of an aqueous solution containing 5 percent sodium sulfite was added. The reaction mixture was concentrated to dryness and partitioned between water and methylene chloride. The organic layer was washed twice with 1N aqueous HCl and once with a 5 percent by weight sodium bicarbonate aqueous solution, dried and evaporated to afford 0.5 g. of oil. The material was chromatographed on 25 g. of silica gel. Benzene-ethyl acetate (99:1 and 49:1 parts by volume) eluted the product which was recrystallized from diethyl ether-petroleum ether to produce 3-methoxy-19-norpregna-1,3,5(10)-trien-17α-ol-20-one.

EXAMPLE 7

By the procedure of Example 6, trans-3-methoxy-21-acetoxy-19-norpregna-1,3,5(10),17(20)-tetraene is converted to 3-methoxy-21-acetoxy-17α-hydroxy-19-norpregn-1,3,5(10)-trien-20 one.

EXAMPLE 8

By the procedure of Example 4:
21-chloro-3-oxo-pregna-4,17(20)-diene is converted to 3-oxo-21-acetoxy-pregna-4,17(20)-diene;
21-chloro-3-oxo-19-norpregna-4,17(20)-diene is converted to 21-acetoxy-3-oxo-19-norpregna-4,17(20)-diene;
21-chloro-3-oxo-pregn-17(20)-ene is converted to 21-acetoxy-3-oxo-pregn-17(20)-ene;
21-chloro-3-oxo-19-norpregn-17(20)-ene is converted to 21-acetoxy-3-oxo-19-norpregn-17(20)-ene;
21 chloro-3β-hydroxy-pregn-17(20)-ene is converted to 21-acetoxy-3β-hydroxy-pregn-17(20)-ene;
21-chloro-3β-hydroxy-19-norpregn-17(20)-ene is converted to 21-acetoxy-3β-hydroxy-19-norpregn-17(20)-ene;
21-chloro-3-oxo-pregna-1,4,17(20)-triene is converted to 21-acetoxy-3-oxo-pregna-1,4,17(20)-triene;
3-acetoxy-21-chloro-pregn-17(20)-ene is converted to 3,21-diacetoxy-pregn-17(20)-ene;
3-acetoxy-21-chloro-19-norpregn-17(20)-ene is converted to 3,21-diacetoxy-19-norpregn-17(20)-ene;
21-chloro-3-oxo-pregna-5,17(20)-diene is converted to 21-acetoxy-3-oxo-pregna-5,17(20)-diene; and
21-chloro-3,3-ethylenedioxy-pregna-5,17(20)-diene is converted to 21-acetoxy-3,3-ethylenedioxypregna-5,17(20)-diene.

EXAMPLE 9

By the procedure of Example 6:
21-acetoxy-3-oxo-pregna-4,17(20)-diene is converted to 3-oxo-21-acetoxy-17α-hydroxy-pregn-4-en-20-one;
21-acetoxy-3-oxo-19-norpregna-4,17(20)-diene is converted to 21-acetoxy-3-oxo-17α-hydroxy-19-norpregn-4-en-20-one;
21-acetoxy-3-oxo-pregn-17(20)-ene is converted to 21-acetoxy-3-oxo-17α-hydroxy-pregnan-20-one;
21-acetoxy-3-oxo-19-norpregn-17(20)-ene is converted to 21-acetoxy-3-oxo-17α-hydroxy-19-norpregnan-20-one;
21-acetoxy-3β-hydroxy-pregn-17(20)-ene is converted to 21-acetoxy-3β,17α-dihydroxy-pregnan-20-one;
21-acetoxy-3β-hydroxy-19-norpregn-17(20)-ene is converted to 21-acetoxy-3β,17α-dihydroxy-19-norpregnan-20-one;

21-acetoxy-3-oxo-pregna-1,4,17(20)-triene is converted to 21-acetoxy-3-oxo-17α-hydroxy-pregna-1,4-dieney20-one;

3,21-diacetoxy-pregn-17(20)-ene is converted to 3,21-diacetoxy-17α-hydroxy-pregnan-20-one;

3,21-diacetoxy-19-norpregn-17(20)-ene is converted to 3,21-diacetoxy-17α-hydroxy-19-norpregnan-20-one;

21-acetoxy-3-oxo-pregna-5,17(20)-diene is converted to 21-acetoxy-3-oxo-17α-hydroxy-pregn-5-en-20-one; and 21-acetoxy-3,3-ethylenedioxy-pregna-5,17(20)-diene is converted to 21-acetoxy-17α-hydroxy-3,3-ethylene-dioxy-pregn-5-en-20-one.

We claim:

1. A process for preparing 17(2-haloethylidene)-steroids and 19-nor steroids comprising treating a 17α-vinyl-17β-hydroxy steroid or 19-nor steroid with vanadium tetrachloride.

2. The process of claim 1 wherein said 17α-vinyl-17β-hydroxy steroid or 19-nor steroid is treated in the presence of a base selected from the group consisting of alkali metal salts or organic amine salts of a lower alkanoic acid.

3. The process of claim 2 wherein said base is an alkali metal salt of a lower alkanoic acid.

4. A process for preparing halo steroids of the formula:

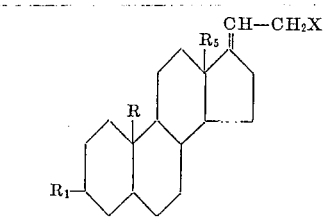

wherein X is halogen; R and R$_5$ are hydrogen or lower alkyl; R$_1$ is hydrogen, hydroxy, lower alkoxy, oxo or a group convertible thereto by hydrolysis or Δ$^1$, Δ$^4$, Δ$^5$, Δ$^{1,4}$ derivatives thereof;

comprising treating a vinyl steroid of the formula:

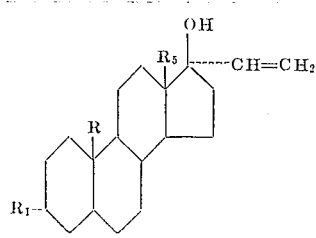

wherein R, R$_1$ and R$_5$ are as above; or Δ$^1$, Δ$^4$, Δ$^5$ or Δ$^{1,4}$ derivatives thereof;

with vanadium tetrachloride.

5. The process of claim 4 wherein said vinyl steroid is treated with vanadium tetrachloride in the presence of a base selected from the group consisting of alkali metal salts or organic amine salts of a lower alkanoic acid.

6. The process of claim 5 wherein said vinyl compound is 17α-hydroxy-17β-vinyl-androst-4-en-3-one.

7. The process of claim 5 wherein said base is an alkali metal salt of a lower alkanoic acid.

8. The process of claim 4 wherein said vinyl compound is 17-vinyl-androst-5-ene-3β,17βdiol.

9. The process of claim 4 wherein said vinyl compound 3,3-ethylenedioxy-17-vinyl-androst-5-en-17-ol.

10. A process for preparing halo steroids of the formula:

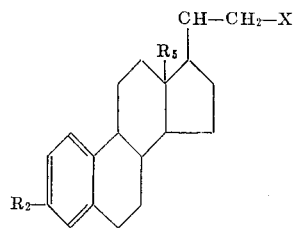

wherein X is halogen and R$_2$ is hydrogen, lower alkoxy, hydroxy or a group convertible thereto by hydrolysis; R$_5$ is hydrogen or lower alkyl, comprising treating a compound of the formula:

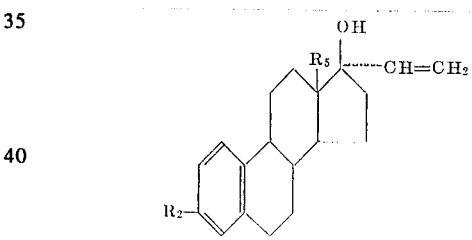

wherein R$_2$ is as above;

with vanadium tetrachloride.

11. The process of claim 10 wherein said compound is treated in the presence of a base selected from the group consisting of alkali metal salts or organic amine salts of a lower alkanoic acid.

12. The process of claim 11 wherein said base is an alkali metal salt of a lower alkanoic acid.

13. The process of claim 10 wherein said vinyl compound is 17α-vinylestradiol-3-methyl ether.

* * * * *